United States Patent [19]
Pedersen

[11] 3,807,130
[45] Apr. 30, 1974

[54] METHOD AND APPARATUS FOR BATCH PACKING OF FOOD IN TUBULAR FILMS

[75] Inventor: Hans Aksel Hindkjaer Pedersen, Aalborg, Denmark

[73] Assignee: Cimbrer Staal A/S, Fabriksparken, Denmark

[22] Filed: Apr. 25, 1972

[21] Appl. No.: 247,423

[30] Foreign Application Priority Data
May 12, 1971  Denmark............................ 2273/71
Mar. 20, 1972 Denmark............................ 3573/72

[52] U.S. Cl. ................. 53/258, 53/22 B, 53/112 B
[51] Int. Cl. ......................... B65b 3/12, B65b 31/04
[58] Field of Search .............. 53/112 A, 112 B, 258

[56] References Cited
UNITED STATES PATENTS
3,624,982   12/1971   Marietta...................... 53/112 B X
2,737,000   3/1956    McCargar..................... 53/112 A
3,593,484   7/1971    Dussich........................ 53/124 E X Primary Examiner—Travis S. McGehee
Attorney, Agent, or Firm—Edward F. Levy

[57] ABSTRACT

In the packing of meat within a tubular synthetic film casing, the casing is mounted in bunched, pleated condition on the outer surface of a hollow tubular housing and is sealed off at the forward end thereof which overlies the front end of the housing. A cut piece of meat is inserted through the rear end of the housing and air is evacuated from the interior of the latter, drawing the sealed end of the casing into the housing and against the forward end of the meat. The meat piece is then pushed forwardly through and out of the evacuated housing, drawing a length of the tubular casing with it, the casing wrapping tightly and smoothly about the meat. The opposite end of the casing is sealed off and cut, resulting in a packaged meat product without air trapped therein.

7 Claims, 3 Drawing Figures

METHOD AND APPARATUS FOR BATCH PACKING OF FOOD IN TUBULAR FILMS

The present invention relates to a method and an apparatus for the packing of food portions in tubular film, particularly to the air-tight packing of cut meat to produce packages of cut beef or the like for the retail trade.

A well-known procedure for making up retail portions of packaged meat or the like is to cut off a desired length of an endless synthetic casing, close off one end of the casing as with a clip, fill in the meat, connect the open end of the casing to an evacuation branch while the meat is usually worked simultaneously with the hands from outside the casing, and finally sealing the open end of the casing with a clip.

In following this known process, air becomes trapped beneath the meat, and such air cannot subsequently be extracted since the evacuation effect causes the synthetic casing film to collapse around the sides of the meat therewithin. The manual working or kneading of the meat and the packing film will to some degree cause the trapped air to move toward the evacuation branch, but the process requires considerable effort and is time consuming. It also involves the risk of puncturing the film, and the meat may give off more juice to the surface than is desirable.

It is an object of the present invention to provide a method and apparatus for meat packing which will avoid the aforementioned difficulties. In accordance with the method of the invention, articles of food are placed upon or within carrying or feeding means and are conveyed into an enclosed space which is then sealed off at the inlet end. The open outlet end of the enclosed space is covered over by the sealed end of a tubular film, the open end of which is pulled over the outer wall of said space in the direction of the inlet end thereof. Thereafter the air within the space is evacuated while the sealed end portion of the tubular film is drawn into the space and against the article of food therein. Simultaneously, or immediately thereafter, the article of food is pushed forwardly, supported by the carrying and feeding means, and out of the open outlet end of the space. The meat portion thus emerges tightly covered by the tubular film which is then sealed off at the end adjacent the outlet opening, for example by permanent clipping devices or heat sealing.

This procedure provides a quick and trouble-free hygienic packing well suited for mass production in factories producing cut meat and other articles of food which, because or irregular shape for example, have not been suitable for vacuum packing in a safe, quick and economical way.

For the closing of the tubular film, the synthetic casing, at the ends of the packed article of food, can optionally, be secured by conventional twisting and/or tying up operations, but a more expedient method in accordance with the invention is to close the filled casing extruded from the space by an airtight sealing of the film portion closest to the space, for example by means of permanent clipping devices or by heat sealing.

For further efficiency in the packing, the procedure according to this invention can be followed in such a manner that the closing operation if performed over a certain length, respectively at two points close to each other on the tubular film, whereafter the length of film is cut to sever the film between the two closing points.

The apparatus according to the present invention comprises an oblong space open at both ends and enclosed by a tube, carrying and feeding means for supporting and conveying cut meat or the like through the space, an outer tube surface suitable for receiving a considerable length of tubular film thereon in bunched or rolled-up, wrinkled condition, means for evacuation of the space, and devices for sealing and preferably also severing of the tubular film at a position close to the delivery end of the space.

In addition to the aforementioned advantages, the result will be, among other things, a very simple apparatus which is well suited for employing "endless" or rather very long tubular films, and which on account of the location of these films, can be made with a relatively very short length.

In a preferred embodiment the apparatus is so designed that it can cooperate with a take-off conveyor belt which is positioned approximately level with the underside of the tube, and the forward movement of the conveyor belt can be stopped manually. Said apparatus may also be so constructed that the vacuum inside the tube can be broken, preferably automatically, during the forward movement of the conveyor belt.

Such automatic operation will greatly facilitate the removal of large parcels of packed food from the apparatus as a manually operated actuating device will engage the forward drive of the conveyor belt and simultaneously break the vacuum built up in the tube. Only simple hand pressure is thereafter required to lower the evacuated and partially ejected food packing downwardly on to the conveyor belt.

The food pack will then be conveyed by the conveyor food pack will then be conveyed by the conveyor belt all the way out of the tube without being damaged or wrinkled, whereafter the conveyor belt is stopped, vacuum is applied to the tube (which by means of a vacuum tank can be effected almost immediately), a closing operation is performed on the end of the packing nearest to the apparatus, the vacuum is broken again, and finally the tubular film is severed.

The finished and severed food pack is thereafter taken into a plant for shrinkage of the tubular film, which may be accomplished by running it through a so-called shrinkage tunnel in which the pre-stretched tubular film employed is subjected to a short exposure to heat, resulting in a perfectly smooth and tight fit around the packed article of food.

In order to obtain a simple performance of the evacuation prior to the sealing operation without risk of a bad seal, it is expedient to combine the forward movement of the articles of food with the closing operation of the tightening devices so that the tightening devices function as a sealing piston positioned behind the carrying members and following them during the charging operation. The forward and outer face of the said piston is designed to cooperate with a preferably concave or conical sealing surface at the inlet end of the space.

To further simplify the functioning of the apparatus, it would be desirable that the charging of the food in special carrying members be combined with the subsequent ejection of the food. In such a combination, however, there would ordinarily be no room available for the carrying members, or the latter would tear the packing film.

In order to achieve this desired result, the apparatus of the invention is designed in such a way that the piston contains a stuffed and airtight piston rod with an ejector head, the said sealing piston and ejector head with attached piston rod, are coupled together by means of a connection releasable at a selected feeding power.

For the purpose of rapid and safe manual filling of cut meat pieces or the like in the carrying and feeding arrangements, and in order to insure that there will be no crumpling up or jamming of the food at certain points inside the space with a consequent blocking of the vacuum and thus interference with the effective evacuation of the whole piece of food, which may also make difficult the ejection of the food from the space during the final part of the packing process, the apparatus in a preferred embodiment includes carrying means comprising a tray which may have the form of a part of a cylindrical tube.

Partly to insure the correct guidance of the tray into the space, and partly to further insure against vacuum blocking inside the space, a practical feature of the apparatus contemplates that the tray is open upwardly at its rear end nearest the sealing piston, but at its other end has at least one narrow ring-shaped part which fits with a clearance inside the space.

The stock of tubular film is, as previously mentioned, bunched or rolled up in wrinkles on the outer surface of the tube defining the filling space, and consequently it becomes necessary during the packing process to insure that the tubular film is smoothed out completely before it is used in the packing process. This smoothing may, for instance, be done manually by an operator wearing wet gloves, who gently holds back the tubular film as it is pulled from the said outer surface. An equally effective, or even better smoothing result is achieved without manual assistance according to the invention by incorporating into the apparatus gently-acting stroking devices fitted around or located adjacent the outer surface of the tube. Such a stroking device may comprise a synthetic rubber lip-packing which presses against the tube surface for smooth stretching of the tubular film. If such a lip-packing is employed, it will be most expediently oriented so that the lip-packing will turn the free edge of its lip in the direction towards the delivery end of the filling space.

Additional objects and advantages of the invention will become apparent during the course of the following specification when taken in connection with the accompanying drawings, in which.

Figure 1:
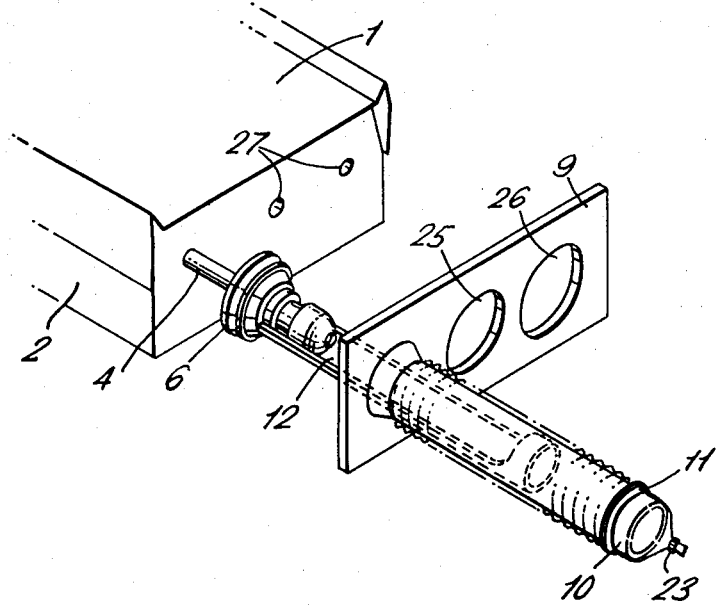
FIG. 1 is a perspective, schematic view of a food-packing apparatus made in accordance with the present invention.

Referring in detail to the drawings, there is shown in FIG. 1 a tray 1 made of stainless steel, upon which can be placed cut pieces of meat which are ready for packing. Beneath the tray 1 is mounted a closed box 2 within which are contained a number of hydraulic cylinders 3 (FIG. 2), the latter being enclosed for hygienic purposes. Through the front wall of the box 2 project a number of piston rods 4 extending from the respective cylinders 3. For clarity of illustration, FIG. 1 shows only a single piston rod 4, but it is to be understood that in practice a plurality of piston rods may extend from the front of the box 2. For example, the holes 27 in the front wall indicate the places where two additional piston rods will project.

Figure 3:
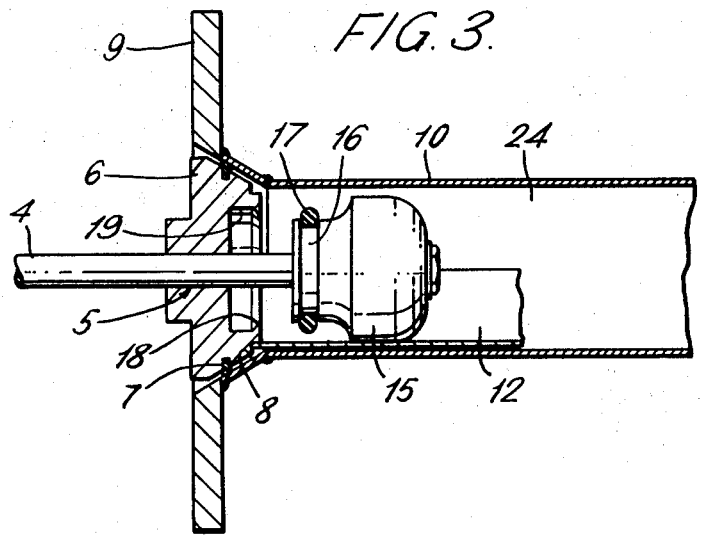
FIG. 3 is a side elevational view of a portion of the apparatus shown in FIG. 2, with the parts thereof illustrated in a different position during the packing operation.
Figure 2:
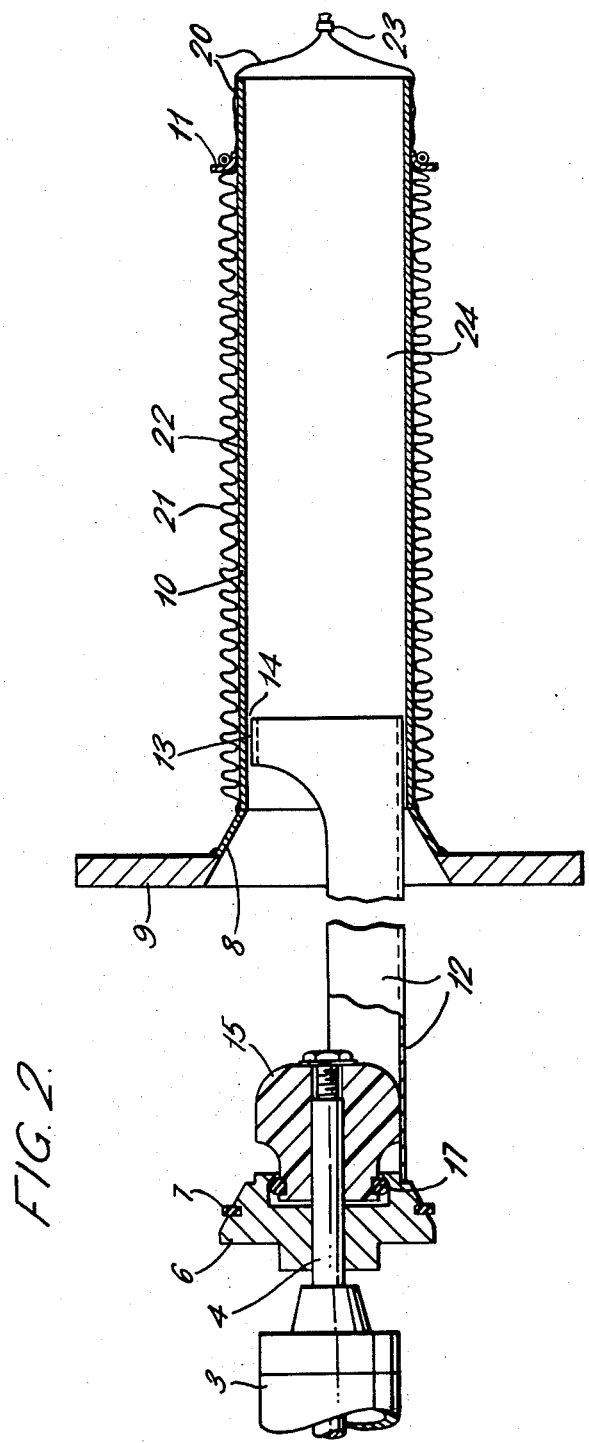
FIG. 2 is a side elevational view of the apparatus of FIG. 1, on a larger scale, with portions thereof shown in section.

Slidably mounted on the piston rod 4 is a sealing piston 6 which may be made of a polyamide or similar substance. The sealing piston 6 makes a tight airtight fit about the piston rod 4, as indicated at 5, by means of a stuffing box (not shown). At its forward outer face, the sealing piston 6 is fitted with a synthetic rubber packing ring 7 which interengages with a concave sealing surface 8, as shown in FIGS. 2 and 3. The sealing surface 8 is formed partially by a strong flange 9 and partially by a conical piece of tubing welded to the flange 9 and continuing in a cylindrical tube 10, the outer surface of which is highly polished. The tube 10 has an open end opposite the flange 9, adjacent to which open end there is mounted about the tube a spring-loaded synthetic rubber lip-packing 11 which may be, for example, the type known as a "Gaco" packing or "Simmering" packing. The lip of packing 11 is shown in FIG. 2 as facing to the right, but it may, in certain circumstances, be positioned in the opposite direction for reasons to be presently explained.

Affixed to the forward face of the sealing piston 6 is a semi-cylindrical tray-shaped carrying member 12 which terminates at its free end in a cylindrical ring 13 which is sized to fit with ample clearance within the tube 10, as indicated by reference numeral 14 in FIG. 2.

To the extreme end of piston rod 4, which projects forwardly of sealing piston 6, there is secured an ejector head 15, the forward end of which may be cross-knurled and provided with through bores for air passage. The rear end of the ejector head 15 is adapted to be releasably connected to the sealing piston 6 by means of a small O-ring 17 mounted within a groove 16. As shown in FIGS. 2 and 3, the O-ring 17 is sized to snap past an inwardly-projecting flange 18 on the sealing piston 6, under the influence of applied axial force, and move into and out of a recess 19 in the face of said sealing piston 6.

In use of the apparatus, employing the method of the present invention, the initial position will be approximately as shown in FIG. 2, wherein the piston rod 4 with its mounted sealing piston 6 and tray 12 are drawn back toward the box 2 to a somewhat greater extent than shown in FIG. 1. The sealing piston 6 is coupled to the ejector head 15 by means of the O-ring 17, as shown in FIG. 2, and the tray 12 is exposed and accessible to be filled from above with a cut piece of meat along a major portion of its length. After the piece of meat, which is not shown in the drawings, has been so placed, the piston rod 6 is driven forwardly, i.e. to the right as viewed in FIG. 2, carrying with it the sealing piston 6 and the tray 12, until the sealing piston 6 and attached packing ring 7 seal tightly against the sealing surface 8, and the sealing piston is thus stopped from further forward movement. At this point, the tray 12 has moved completely within the tube 10, and its ring-shaped terminal portion 13 is located close to the right-hand open end of the tube 10, which is the outlet end thereof.

A long length of tubular film constituting a synthetic casing 20 has been rolled back or compressed in wrinkles or folds 21 around the polished outer surface 22 of the tube 10, after which the spring-loaded lip-packing 11 is drawn in over the front end portion of the synthetic casing 20, as best shown in FIG. 2. If the synthetic casing 20 is made of such material and thickness that it is liable to be torn, but is not liable to form folds under the lip-packing 11, the said lip-packing is positioned as shown in FIG. 2, that is facing the right-hand, open outlet end of tube 10, thereby easing the passage of the casing film therebeneath. If, however, the synthetic casing 20 is very tear-resistant but has a tendency to make folds beneath the lip-packing 11, the lip-packing can be placed in the reverse position from that shown in FIG. 2. The lip-packing is held immovably in position by means of holding devices (not shown) which may be fixed to the flange 9. The right-hand end of the synthetic casing 20 extends beyond the open end of tube 10 and is sealed airtight by means of a metal clip 23 or by heat sealing or the like.

The space or chamber 24 within the interior of tube 10 is now in closed airtight condition, and it is evacuated by suitable means (not shown). Such air evacuation draws the sealed right-hand end of the synthetic casing 20 a short distance into the interior 24 of the tube 10 until it comes into contact with the piece of meat resting on the tray 12.

Simultaneously with, or after the aforementioned air evacuation, the outward driving force on the piston rod 4 is increased to such an extent that the rubber O-ring 17 can snap over the flange 18 and the ring moves out of the recess 19, so that the ejector head is uncoupled from the sealing piston 6 which is held immovably by its contact with sealing surface 8. The released ejector head 15 is now moved by piston rod 4 in a right-hand direction through the tube 10 so that it engages the meat on the tray 12 and pushes the meat completely or substantially completely out of the evacuated interior space 24 of tube 10.

As the meat is ejected from the chamber 24 within tube 10, it draws the casing 20 with it, the latter feeding smoothly beneath the lip-packing 11 until a sufficient length has been drawn to encase the entire length of meat. At the end of the stroke of the ejector head 15, the piece of meat has been ejected and wrapped tightly in a smooth synthetic casing 20, in a position outside of tube 10 at the forward or right-hand end of the latter. By conventional apparatus it is then possible to seal the synthetic casing 20 at the end of the meat piece adjacent the tube 10, by means of two closely spaced metal clips of a type similar to the clip 23. Immediately after such sealing, the casing may be severed at a point between the two clipped sealing points and the sealed and packed meat piece removed. The remaining portion of the synthetic casing pleated on the outer surface 22 of tube 10 is now sealed at its right hand and by a clip 23 and is ready for the next packing and sealing operation.

To bring the apparatus back to its starting condition, the vacuum in the space or chamber 24 is neutralized, and the piston rod 4 is drawn back into cylinder 3, moving the ejector head 15 rearwardly or to the left as viewed in FIG. 3, until the ejector head engages sealing piston 6 and thereafter carries the sealing piston with it in its further rearward movement. When the hydraulic or pneumatic cylinder 3 has drawn the piston rod 4 back to its fullest extent, the rubber ring 17 again is snapped into recess 19 to couple the ejector head 15 with the sealing piston 6, and the next packing operation can begin.

While there is shown in FIG. 1 only a single packing unit comprising parts 4,6,10 and 12, it is indicated both by holes 27 in the box 2 and by openings 25 and 26 in the flange 9, the manner in which it is possible to provide the apparatus with a plurality of sets of packing units.

The box 2, the flange 9, and the auxiliary sealing and severing mechanism which may be employed, can be supported on the floor of the room, either separately or on a common frame. The apparaus may be fitted with safety guards and breakers to prevent injury to persons.

For improved economy, the apparatus may be provided with removable and replaceable tubes 10 of different cross sections, which may be exchanged to accomodate meat pieces of varying sizes.

The apparatus may be mounted so that its delivery end is adjacent a conveyor belt of conventional type (not shown), which belt is approximately level with the under surface of the tubes 10, and is driven to move in a direction away from the apparatus so as to carry away the packaged meat products. The conveyor belt assembly may be constructed in a well-known manner so as to be stopped manually, and may be coordinated in operation with the evacuation apparatus such that the vacuum in tube 10 is broken automatically during the forward movement of the conveyor belt.

Where a plurality of tubes 10 are grouped together for simultaneous operation, it is preferred that the tubes be so positioned that their bottom edges are at a common level. This facilitates the delivery of the ready-packed articles on a table or conveyor belt.

While a preferred embodiment of the invention has been shown and described herein, it is obvious that numerous omissions, changes and additions may be made in such embodiment without departing from the spirit and scope of the invention.

What is claimed is:

1. Apparatus for the packing of portions of food articles such as cut meat for producing airtight retail food packages, comprising
   a stationary tube defining therewith an elongated chamber having an open inlet end and an open outlet end,
   an outer surface on said tube sized and adapted to receive thereabout a considerable length of tubular film in bunched, pleated condition, with said bunched film extending longitudinally along the tube from the outlet end of said chamber toward the inlet end thereof, with the end of said tubular film sealed of at the outlet end of said tube,
   a semi-cylindrical tray for supporting a food portion thereon, said tray being sized to fit within said tube and being of a length substantially equal to the length of said tube,
   a sealing member integral with the rear end of said tray and movable therewith,
   means for moving said sealing member and tray with said food portion thereon in a direction to bring said tray fully within the interior of said tube through the open inlet end thereof, with said sealing member making sealing engagement with the inlet end of said tube, and an ejector member coupled to said sealing member and movable therewith into the interior of said tube, and means for uncoupling said ejecter member from said sealing member and moving said ejector member through said tube independently of said sealing member after the latter is in sealing engagement with the inlet end of said tube, whereby said ejector member pushes said food portion from the outlet end of said tube with a length of tubular film wrapped around said food portion.

2. Apparatus according to claim 1 in which said sealing member comprises a sealing piston having a forward outer surface sized and shaped to make flush engagement with a concave sealing surface at the inlet end of said chamber.

3. Apparatus according to claim 2 which also includes a piston rod carrying said sealing piston and having an airtight sliding connection therewith, said ejector member comprising an ejector head affixed to the end of said piston rod, and releasable connecting means coupling said ejector head with said sealing piston for release at a selected feeding force.

4. Apparatus according to claim 3 in which said releasable connecting means includes a recess in the face of said sealing piston, a flange bordering said recess, and an O-ring mounted on said ejector head and sized to snap past said flange and move into said recess.

5. Apparatus according to claim 1 in which the rear portion of said tray is open at its top, the front end portion of said tray having at least one ring member having a clearance fit within said chamber.

6. Apparatus according to claim 1 in which lightly tensioned stroking means is positioned around the outer surface of said tube adjacent the outlet end thereof, said stroking means comprising an elastomeric lip-packing positioned to press toward the tube outer surface for smooth stretching of the tubular film drawn between said lip-packing and said tube surface.

7. Apparatus according to claim 6 in which said lip-packing has a free edge positioned to face in a direction toward the outlet end of said chamber.

* * * * *